June 25, 1968          D. E. KRAMER          3,390,371
CABLE CLAMP FOR ELECTRICAL WIRING DEVICE
Filed June 24, 1966
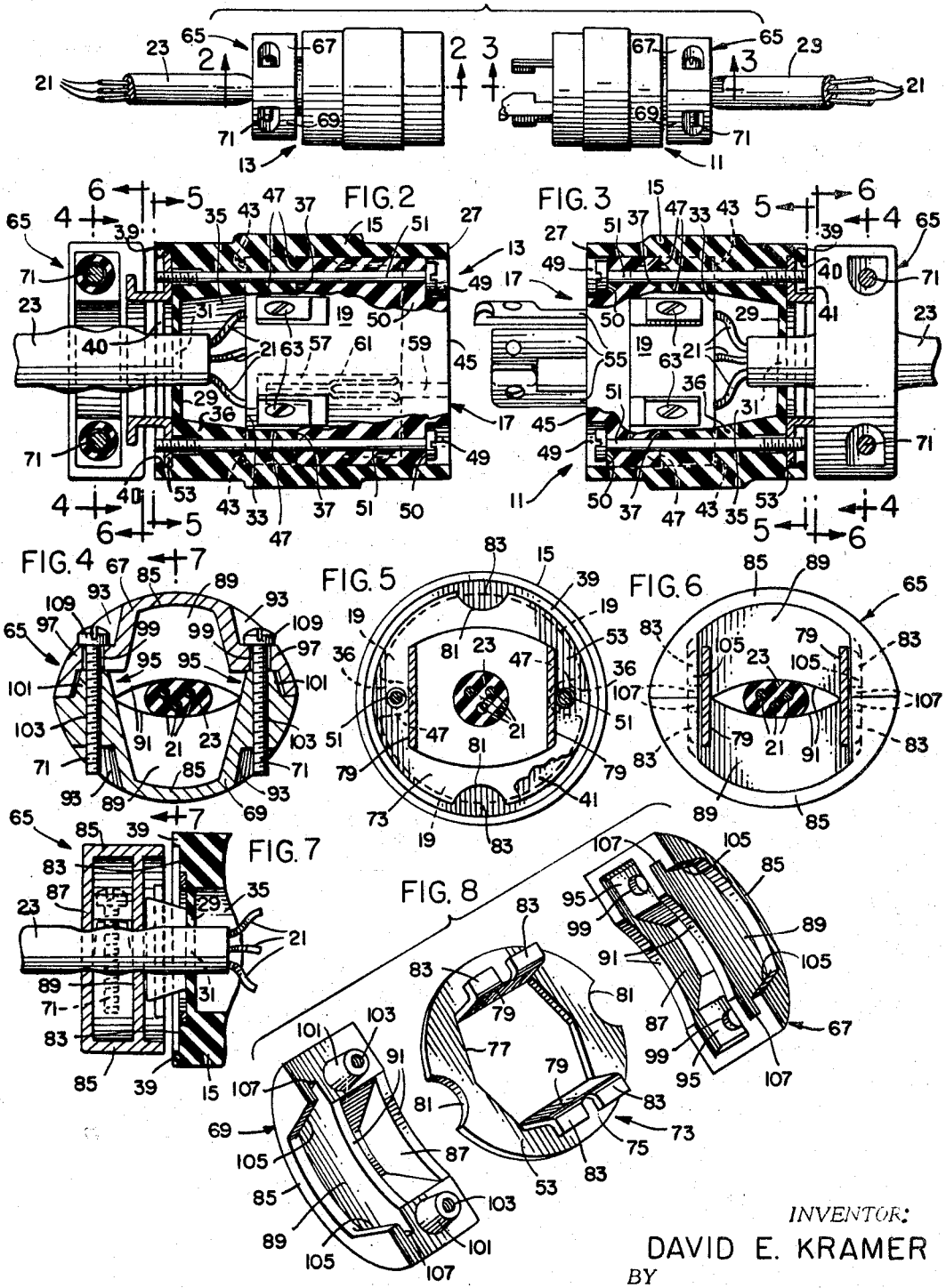
INVENTOR:
DAVID E. KRAMER
BY
Marzall, Johnston, Cook&Root
ATTORNEYS United States Patent Office 3,390,371
Patented June 25, 1968

1

3,390,371
CABLE CLAMP FOR ELECTRICAL
WIRING DEVICE
David E. Kramer, Morton Grove, Ill., assignor to Daniel
Woodhead Company, Chicago, Ill., a corporation of
Illinois
Filed June 24, 1966, Ser. No. 560,167
11 Claims. (Cl. 339—107)

ABSTRACT OF THE DISCLOSURE

An electrical wiring device and associated cable clamp, wherein the wiring device comprises axially aligned components including a generally cylindrical support body carrying electrical elements mounted thereon, and a jacket enclosing the sides and an end of said body, the body end enclosing portions of said jacket forming an outwardly facing seat for supporting a formed sheet metal bracket, fastening stems having ends attached to the bracket and extending thence through the aligned components, the bracket remote ends of the stems having heads engaging in bracket remote seats, formed in said body, to thereby hold the components together in assembled relationship, with the bracket held in the seat, said cable clamp comprising a pair of hollow, molded plastic parts held together in position to clamp upon the opposite sides of a device connected cable and in interfitting relation with outwardly and oppositely extending clamp carrying flanges on the bracket.

The present invention relates in general to cable clamps for electrical wiring devices, and has more particular reference to an improved structure for clamping insulated electrical cable or cord having conductors connected with the connection terminals of a wiring device with which the clamp is associated, in order to relieve strain on the conductor connections, which may be produced as the result of tension applied on the cord.

An important object of the present invention is to provide a clamp adapted to accommodate cable of various diametral size without sacrifice of clamping efficiency when employed with cords of minimum size.

Another important object is to provide a clamp of the character mentioned having cable clamping elements of plastic material, thereby eliminating the possibility of short circuiting the conductors of worn, frayed or otherwise deteriorated cable through conductor contact with a clamping member; a further object being to provide molded plastic clamping members having substantially uniform sectional thickness throughout, and configurated to provide appreciable and adequate clamping strength in said members of otherwise inherently weak material as compared with conventional metal clamping members.

Another important object is to provide a pair of cooperating clamping members of generally semicircular configuration, each having spaced apart side walls forming clamping edges, the clamping members having interfitting means to position the clamping edges of the walls of one member in facing registration with the clamping edges of the walls of the cooperating member, whereby a cord may be clamped between the members at a pair of spaced apart clamping stations, each defined at and between a facing pair of said clamping edges.

2

A further important object of the invention is to clampingly interconnect a cooperating pair of clamping members by means of a pair of screws each turnably received in a corresponding channel formed in one member and having screw threaded engagement in an aligned portion of the other member.

A still further object of the invention is to provide one of the clamp members with elongated embossments forming extended screw threaded portions, providing adequate screw holding ability in the threaded portions of the plastic clamping member.

Another important object is to provide a preferably sheet metal mounting bracket for attaching clamping members upon the body of a wiring device, the bracket providing spaced apart flanged clamp mounting portions and said clamps having flange receiving grooves adapted to slidingly engage the opposite ends of the bracket flanges, as the clamping members are drawn together upon a cable to be clamped.

Another important object is to form the mounting bracket from a circular piece of sheet metal by bending, from its central portions, a pair of spaced apart, outstanding clamp supporting legs; a further object being to form the terminal ends of the legs with clamp mounting flanges.

Still another object of the invention is to form the plate portion of the mounting bracket with a pair of spaced apart threaded openings, as at and outwardly of the clamp mounting legs, whereby the mounting bracket may be secured on the body of a wiring device upon which it may be desired to mount the clamp.

A further important object of the invention is to form a wiring device in sections adapted to be secured together and held in assembled relationship by screw threaded members penetrating and extending in aligned channels formed in the sections, the threaded members having screw threaded engagement in threaded openings formed in the mounting bracket, said screw threaded members, at the ends thereof remote from the mounting bracket having clamping engagement with one of the sections of the wiring device, whereby said threaded members may clamp the sections of the device together in assembled relationship, and also clampingly secure the bracket in the assembly as a component thereof.

Another important object is to provide a wiring device comprising a pair of detachable interfitting circuit coupling components, each having a body of insulating material carrying contact making electrodes and conductor connection terminals electrically connected with said contact making terminals, each component also comprising a body enclosing jacket of insulating material preferably having rubbery characteristics, said jacket being of sleeve-like configuration open at one end to provide a cavity for receiving the body of the coupling component, the jacket preferably having a bottom end closed by a preferably integral thin diaphragm wall formed with a central perforation for snugly receiving an electrical cable or cord therethrough, the jacket preferably also having internal abutments for engaging and supporting the body in position spaced inwardly of said diaphragm, with the diaphragm remote end of the body disposed at the open end of the jacket, thereby affording a chamber enclosing the component connected end of a cable, and providing a space in which the separated ends of the cable conductors may extend to and be electrically connected with the conductor connecting terminals of the wiring device, the central diaphragm opening being adapted to snugly embrace the cord and thereby prevent moisture, dirt, vapor and other foreign matter from seeping into the connection chamber along the surface of the cord.

The foregoing and numerous other important objects, advantages and inherent functions of the invention will become apparent as the same is more fully understood from the following description, which, taken in conjunction with the accompanying drawings, discloses a preferred embodiment of the invention.

Referring to the drawings:

FIG. 1 shows side views of the cooperating coupling components of an electrical connector forming a wiring device, each of the components being provided with a cable clamping structure embodying the present invention, said coupling components being shown in position to be coupled together by axial movement thereof;

FIG. 2 and 3, respectively, are sectional views taken substantially along the lines 2—2 and 3—3 in FIG. 1;

FIGS. 4, 5 and 6 are sectional views, respectively, taken along the lines 4—4, 5—5 and 6—6 in FIGS. 2 and 3;

FIG. 7 is a sectional view taken substantially along the line 7—7 in FIG. 4; and FIG. 8 is an exploded view showing clamping components and a clamp mounting bracket which form parts of the devices shown in FIGS. 1–7.

To illustrate the invention, the drawings show a wiring device comprising an electrical connector embodying a pronged component 11 and a cooperating socket component 13 adapted to interfittingly engage with the pronged component in making electrical connection between cables 21 electrically.

Each component connected with the components 11 and 13 may comprise a housing or jacket 15 and an assembly unit 17 mounted in the jacket, and comprising a preferably rigid body or frame 19 forming support means for circuit making terminal elements securely mounted on and carried by the support means.

The coupling components 11 and 13 serve to detachably interconnect the ends of the conductors 21 of the electrical cords or cables 23 that may be electrically connected with the contact making terminals of the components, so that the cable conductors may be electrically interconnected when the coupling components are disposed in interfitting relationship. The coupling components also may be formed with cooperating interlocking means for securing them firmly together in coupled relationship against separation in response to tensional stresses applied on the cables 23, in a direction tending to pull the components apart when coupled.

The housing elements or jackets 15 may comprise preferably cylindrical casings molded or otherwise formed of resilient rubber-like material, said casings being open at one end 27 and having a preferably integral flexible diaphragm 29 extending in position to close the opposite end of the jacket, said diaphragm being formed with a preferably central opening or perforation 31 sized to snugly receive and frictionally engage the outer surface of the cord or cable 23. Inwardly of the diaphragm 29 each jacket may be formed with an internal circular seat 33 facing the open end of the jacket and defining a central cavity 35 within the seat. The jackets 15 may also be formed, preferably on diametrically opposed sides thereof with semicylindrical embossments 36 integral with the jackets at the seats and the peripheral walls thereof, said embossments providing seating surfaces 37 facing the open ends 27 of the jackets. Outwardly of the diaphragms 29 the jackets 15 may each be formed with an outstanding peripheral rib or flange 39 defining a shallow cavity forming a circular seat 41 at the closed end of the jacket, outwardly of the diaphragm 29. The flange 39 at its outer edge may be formed with a radially inwardly extending circumferential bead 40.

The ridge support means 19 of each component preferably comprises a generally cylindrical body of insulating material sized and shaped to fit snugly within the corresponding jacket 15 of the component, the marginal edges 43 of the inner end of the body 19 being adapted to rest upon the seat 33 of the jacket, and thereby support the body in the jacket with the opposite or front end 45 disposed in the open end of the jacket. The body 19 may also be formed with a pair of diametrically opposite semicylindrical cavities 47 opening laterally of and at the inner end of the body in position to snugly receive the semicylindrical embossments formed in the jacket, to thereby determine the relative angular position of the body in the jacket. The body 19 may also be formed with a pair of laterally open and diametrically opposite semicylindrical cavities 49, forming seats 50 at the front end 45 of the body, the cavities 47 and 49 being preferably in alignment axially of the body. Means may be provided for securing each of the body members 19 in its associated jacket, said means preferably comprising a pair of elongated fastening screws 51 having heads engaging the seats 50, in the cavities 49, and stems extending thence through aligned channels formed in the body 19 and in the walls of the jacket, between the surfaces 37 of the semi-cylindrical embossments 36 and the bottom of the shallow cavity 41, the head remote ends of said stems extending in said shallow cavity and having threaded engagement with a clamp plate 53.

The contact making terminals of the component 11 may comprise prongs or blades 55 projecting outwardly of the front end 45 of the body element of the component in position to penetrate corresponding cavities 57 formed in the body element 19 of the cooperating component 13. The cavities 57 may open upon the front face 45 of the element through slots 59 shaped to receive the blades 55 in position to make electrical contact with prong engaging electrodes 61 mounted in the cavities 57. Conventional conductor connecting terminals may be mounted in the body elements 19 of both components, and the cable conductors 21 may be inserted into engagement with said connection terminals through openings formed in the rear faces of the body elements 19; and said conductors may be secured to and in electrical contact with the connection terminals, as by means of clamp screws 63 mounted on the body elements 19 and exposed at their lateral surfaces, the connection terminals of the components 11 and 13 being respectively connected electrically, within the body elements 19, with the prongs 55 and the prong engaging terminals 61. As a consequence, when the components 11 and 13 are coupled together, with the prongs 55 of one component in electrical contact with the prong engaging terminals 61 of the other component, the conductors 21 of the cable connected with the component 11 will be electrically connected with the conductors 21 of the cable that is connected with the component 13.

In order to electrically interconnect the conductors 21 of cables 23 with the components 11 and 13, the clamp screws 51 may be unthreaded from the clamp member 53, thereby permitting the body element 19 to be withdrawn from the sleeve 15 through the open end thereof. The end of the cable 23 to be connected may then be inserted through the diaphragm opening 31 and passed thence through the sleeve and outwardly of its open end. The bared ends of the cable conductors 21 may then be inserted into the connection terminals at the rear end of the body member and secured in place by tightening the clamp screws 63, after which the connected cable 23 may be withdrawn outwardly through the diaphragm opening 31 and the body element 19 of the component simultaneously returned to seated position in the jacket 15, after which the screws 51 may be tightened into the clamp plate 53 to secure the parts together in assembled relationship, the end of the cable 23 together with the connected conductors 21 being disposed in the cavity 35.

The diaphragm opening 31 is preferably sized a trifle smaller than the diameter of the cable 23 so that the edges of the opening sealingly engage the periphery of the cable and form a dust, liquid and vapor seal around the cable at the place where it enters the cavity 35.

In order to clampingly secure the cables 23 to the components 11 and 13, thereby eliminating strain on the conductors 21 where the same are clampingly secured to the connection terminals of the coupling components, the present invention contemplates a cable clamp structure 65 comprising a cooperating pair of clamp members 67 and 69 adapted to be drawn together on opposite sides of a cable 21, and thus clampingly secured thereon by means of clamp screws 71. The structure includes a mounting bracket adapted to be firmly secured on the wiring device, as at the cable attaching end thereof, said bracket and the clamping members 67 and 69 being formed with cooperating means, preferably comprising interfitting flanges on the bracket and on the clamping members 67 and 69, for securing the clamp members on the bracket, and hence upon the wiring device when said members are in clamping relationship with the cable.

To these ends, the mounting bracket 73 may comprise a preferably circular sheet metal plate 75 having its central portions bent outwardly of and preferably at right angles with respect to the plate, to form a central opening 77 in the plate and to provide a pair of spaced apart flanges forming legs 79. The remaining generally ring-like portions of the plate 75, which surround the opening 77, may be peripherally sized and shaped to fit snugly in the shallow end cavity 41, within the circular rib 39 and behind the bead 40, at the closed end of the wiring device. The plate 75 also may be formed with threaded openings, immediately outwardly of and centered with respect to the legs 79, to receive the threaded ends of the assembly screws 51, thereby constituting the bracket 73 as the clamp plate 53. The bracket 73 thus serves to hold the parts of the wiring device together in assembled relationship. The peripheral edge of the plate 75 may be provided with one or more orienting notches 81 in position to interfittingly engage a corresponding abutment or abutments 83 formed on the wiring device, as at the edge of the cavity 41, to orient the bracket on the wiring device in position presenting its threaded openings in alignment with the clamp screws 51.

When the mounting bracket is clamped on the end of the wiring device, the diaphragm 29 and its central cable receiving opening 31 will be centered in the bracket opening 77, so that the cable may extend outwardly of the diaphragm freely and without interference from the mounting bracket. The plate remote ends of the flanges, which form the legs 79, may be bent mutually outwardly to form lips 83 extending preferably normal to the legs 79.

The clamp members 67 and 69 preferably comprise electrical insulating material preferably formed as die moldings of high impact plastic such as phenolic resin, polycarbonate resin or other plastic material adapted to form relatively rigid molded parts. The clamp members may comprise hollow members of semi-cylindrical configuration, each having a circularly curved wall 85 and a pair of spaced preferably parallel end walls 87 and 89 integral with an extending normal to and inwardly of the curved wall 85, said walls 87 and 89 having preferably inwardly curved cable clamping edges 91 remote from the curved wall 85. The members 87 and 89 are each formed with a pair of spaced preferably semi-circular seats 93 recessed in the curved wall 85 inwardly of its opposite ends. Opposite the seats 93, the member 67 may be provided with cavities 95 defining clamp screw mounting walls 97 between the seats 93 and the bottoms of the cavities 95, said walls being each formed with a channel 99 therethrough for the freely turnable reception of a clamp screw 71.

The clamp member 69, inwardly of its opposite ends, may be formed with a pair of projecting pedestals 101 in position to interfit in the cavities 95 of the member 67 when the members are drawn together in cable clamping relationship, the pedestals 101 and cavities 95 being disposed at the opposite ends of the cable clamping edges 91 of said clamp members, the pedestals 101 being in coaxial alignment with the bolt channels 99 when the parts are in cable clamping relationship. The pedestals 101 and the material of the clamp member 69 disposed between the pedestal bases and the seat cavities 93 are formed with screw threaded channels 103 for the threaded reception of the stems of the clamp screws 71. The provision of the pedestals 101, together with the thickness of the clamp members 69 between the bases of the pedestals and the seats 93, affords extensive engagement between the threaded stems of the screws and the screw engaging portions of the member 69, thereby assuring against rupture of the threads in the channels 103, even where such threads are formed in relatively weak plastic material.

The circular wall 85 of the clamp members 67 and 69 projects outwardly of the end walls 89 of said members to provide bracket seats immediately outwardly of the walls 89, said seats being defined between mutually inwardly extending lips 105 formed along the opposite sides of the bracket seats and spaced outwardly of the walls 89 to form grooves 107 adapted to define the opposite sides of said bracket seats and to interlockingly receive the lips 83 of the mounting bracket therein as and when the clamping members 67 and 69 are drawn together into clamping position on a cable 23 by tightening the screws 71 in the threaded channels 103, said screws having heads 109 adapted to extend in the seats 93 of the member 67 and engage the walls 97.

When the clamp members 67 and 69 are made of electrical insulating material all danger of short circuiting the conductors of the cable through the clamp structure, in the event of injury to or deterioration of cable insulation, is entirely avoided. The clamp members 67 and 69, moreover, grip the cable at a substantial distance from its stripped ends, thereby affording improved cable holding power because of the substantial length of intact cable sheath between the clamping structure and the end of the cable. The formation of the clamping members with an internal cavity between spaced clamping edges aids in the molding of the members, when made of plastic material, because of the more or less uniform sectional thickness of the walls of the clamping members, the end walls 87 and 89 and the lips 105 preferably having a thickness of the order of 1/16 inch, while the walls 85 and 97 may be somewhat thicker, satisfactory results being realized where the wall 85 is 3/32 inch in thickness and the wall 97 has a thickness of 1/8 inch. The foregoing dimensions, however, are not at all critical. It is desirable, however, that the threaded bolt channel 103 have length sufficient to assure against thread failure, a length of the order of 1/2 inch ordinarily being considered adequate. The interfitting engagement of the bosses 101 in the cavities 95 rigidify the clamping members when in clamping position.

The spaced clamping edges 91, being thin, engage relatively small areas of the clamped cable, and hence require less clamping torque upon the clamp screws 71 in order to attain a desired clamping effect. The employment of a mounting bracket 73 having axially projecting legs and laterally or radially extending lips permits the same to be interlocked in the grooves 107 of the clamping members, which thus enclose and insulate the brackets. The clamping structure, furthermore, is self-centering on the mounting bracket and in this connection the dust, vapor and moisture excluding diaphragm with its central cable receiving opening aids in centering the clamp structure on the mounting bracket.

It will be seen that the clamping members 67 and 69 need not be disconnected from the bracket, nor need the bracket be separated from the jacket 15 in order to disconnect and remove a cable or to electrically connect and mechanically clamp a cable to the wiring device. It is merely necessary to loosen the clamp screws 71 in the channels 103 to permit the clamping members to be separated sufficiently to allow a cable to pass freely therebetween. Thereafter the holding screws 51 may be removed in order to allow the support body or frame 19 of the unit to be removed from the jacket 15, through the open end thereof, and thereby permit the clamp screws 63 to be loosened to release connected conductors 21 or tightened to electrically connect cable conductors. When the screws 51 are disconnected from the mounting bracket 73, said bracket may remain in situ in its seat 41 at the end of the bead 40 serving to hold the edges of the bracket plate 75 within the peripheral rib 39 of the jacket, thereby retaining the bracket, together with the bracket mounted clamping members 67 and 69, in mounted position upon the jacket. After the body member 19 shall have been returned to mounted position within the jacket 15, it is merely necessary to insert the holding screws 51 in the channels formed to receive the same and to re-engage the threaded ends thereof in the threaded openings in the bracket plate 75, to reassemble the wiring device. Thereafter, the clamp screws 71 may be tightened in the channels 103 to draw the clamping members 67 and 69 together into clamping relationship upon the attached cable 23.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the forms herein disclosed being preferred embodiments for the purpose of demonstrating the invention.

The invention is hereby claimed as follows:

1. An electrical wiring device comprising insulating means forming a support, embodying axially aligned components and having an outwardly facing seat at one end of the support, electrical contacts mounted on one of the components in position, enclosed by the other, for electrical connection with the conductors of a cable, a support bracket mounted on said seat, mounting stems each secured at one end thereof to said bracket and extending thence to the bracket remote end of said support, said stems each having a head engaging a corresponding seat formed on said support, remote from said bracket, whereby to secure said components together while holding said bracket on said seat, a cable clamp comprising a pair of cooperating clamp members, each having clamping edges along a side thereof, said members being mounted on said support bracket, and means operable to draw the members clampingly together, on said bracket and upon a conductor cable, with said clamping edges of the members in facing registration and in clamping engagement with opposite sides of the cable to secure the same mechanically to said wiring device.

2. An electrical wiring device, as set forth in claim 1, wherein said mounting bracket is formed with a pair of oppositely extending flanges, said clamp members each being formed with a pair of mutually facing grooves for receiving said flanges slidingly therein, to secure the members on the bracket when drawn together in cable clamping position on the flanges.

3. An electrical wiring device, as set forth in claim 2, wherein the hollow clamp members comprise molded plastic elements of electrical insulating material, forming elongated, hollow, box-like structures having spaced side walls, open bottoms and clamping bolt holes, at their opposite ends, the mutually facing flange receiving grooves being formed on and outwardly of one side of each of said clamp members, at the opposite ends thereof.

4. An electrical wiring device, as set forth in claim 1, wherein the clamp members comprise hollow elongated box-like structures having spaced opposite side walls, open bottoms and holes for clamping bolts formed through the members, at their opposite ends, whereby the members may be secured together for cable clamping purposes with their open bottoms in facing registration.

5. An electrical wiring device, as set forth in claim 4, wherein each clamping bolt is freely turnable in a bolt hole of one clamp member and is threadedly engaged in a threaded channel of the associated clamp member, said associated clamp member, at its said threaded channel, comprising molded plastic material having threaded engagement with its associated bolt through an axial distance of the order of five times the bolt diameter or more.

6. An electrical wiring device, as set forth in claim 4, wherein each clamping bolt is freely turnable in a bolt hole of one clamp member and is threadedly engaged in a threaded channel of the associated clamp member, said associated clamp member comprising molded plastic material and having an embossment at and containing the end portion of said threaded channel, said embossment extending outwardly of the open bottom of said associated clamp member for interfitting engagement in a corresponding cavity in the bottom of said one clamp member.

7. An electrical wiring device comprising insulating means forming a support, embodying axially aligned components including a generally cylindrical body and a jacket, enclosing the sides and one end of said body, the end enclosing portions of said jacket being formed with an outwardly facing seat, electrical contacts mounted on said body, within the jacket, for electrical connection with the conductors of a cable, said end enclosing jacket portions being formed with an opening for receiving a cable end therethrough, within said seat, a support bracket mounted on said seat, outwardly of said opening, mounting stems secured each at one end thereof to said bracket and extending thence through the components to the bracket remote end of the body, said stems each having a head in engagement with a corresponding seat formed on said body remote from said bracket to secure said components together, with said bracket held on said seat, a cable clamp comprising a pair of cooperating clamp members, mounted on said bracket, and means to draw the members clampingly together, on the bracket and upon a cable, to secure the same mechanically to said wiring device.

8. An electrical wiring device, as set forth in claim 7, wherein the bracket comprises a sheet metal disc, and the jacket is formed with a peripheral rib enclosing and defining the seat in which the disc is secured, to align the bracket on the support.

9. An electrical wiring device, as set forth in claim 7, wherein the portions of the jacket which enclose the end of said body form a flexible diaphragm, within the seat, the cable opening being formed in the diaphragm, within the seat medially of said seat, said bracket comprising a disc having peripheral portions mounted in said seat, and having a hole therethrough opposite said diaphragm opening.

10. An electrical wiring device, as set forth in claim 7, wherein the body and jacket are formed with interfitting longitudinally extending ribs and rib receiving grooves circumferentially spaced on the body and jacket to determine the angular orientation of the body in the jacket, said ribs having axial channels for accommodating said holding screws, said bracket disc and said jacket having interfitting tongue and groove means for angularly orienting the bracket disc on the jacket in position to threadingly engage said holding screws.

11. An electrical wiring device, as set forth in claim 7, wherein the body and jacket are formed with interengaging shoulders for supporting the body in the jacket with the bottom end of the body spaced inwardly of the diaphragm forming end wall of the jacket to form a dust and moisture free chamber for receiving the end of a clamped cable inwardly of said diaphragm.

References Cited

UNITED STATES PATENTS

| | | | |
|---|---|---|---|
| 1,026,238 | 5/1912 | Andersen | 339—103 |
| 1,685,420 | 9/1928 | Higham | 339—210 X |
| 1,933,592 | 11/1933 | Hubbell | 339—103 X |
| 2,039,916 | 5/1936 | McIntosh | 339—103 |
| 2,972,492 | 2/1961 | Mintz et al. | 339—103 |
| 3,316,523 | 4/1967 | Trangmar | 339—107 X |

FOREIGN PATENTS

| | | |
|---|---|---|
| 643,218 | 6/1962 | Canada. |
| 1,087,682 | 8/1954 | France. |
| 650,292 | 2/1951 | Great Britain. |
| 1,012,403 | 12/1965 | Great Britain. |

RICHARD E. MOORE, *Primary Examiner.*